United States Patent
Nagasawa (10) Patent No.: US 8,082,011 B2
(45) Date of Patent: Dec. 20, 2011

(54) INFORMATION PROCESSING APPARATUS AND MOBILE COMMUNICATION APPARATUS

(75) Inventor: Kazuyuki Nagasawa, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 292 days.

(21) Appl. No.: 12/558,760

(22) Filed: Sep. 14, 2009

(65) Prior Publication Data

US 2010/0069007 A1    Mar. 18, 2010

(30) Foreign Application Priority Data

Sep. 12, 2008 (JP) .............................. P2008-235615

(51) Int. Cl.
*H04M 1/00* (2006.01)
(52) U.S. Cl. ............... 455/569.1; 455/550.1; 455/575.2; 455/575.3; 455/41.2; 381/105
(58) Field of Classification Search ............... 455/569.1, 455/550.1, 575.2, 575.3, 575.6, 41.2, 569.2; 381/105
See application file for complete search history.

(56) References Cited

U.S. PATENT DOCUMENTS

| | | | | |
|---|---|---|---|---|
| 5,475,872 | A  * | 12/1995 | Sato ........................... | 455/550.1 |
| 7,076,277 | B2 * | 7/2006 | Kim et al. ................. | 455/569.1 |
| 7,231,232 | B2 * | 6/2007 | Osann, Jr. ..................... | 455/567 |
| 7,418,277 | B2 * | 8/2008 | Tsai ........................... | 455/569.2 |
| 7,577,459 | B2 * | 8/2009 | Tuomela et al. ........... | 455/553.1 |
| 7,876,720 | B2 * | 1/2011 | Huertgen et al. ............ | 370/315 |
| 7,953,454 | B2 * | 5/2011 | Ihara et al. ................. | 455/569.1 |
| 7,957,541 | B2 * | 6/2011 | Edgren et al. .................... | 381/89 |
| 7,986,976 | B2 * | 7/2011 | Osann, Jr. ..................... | 455/567 |
| 2004/0185915 | A1 * | 9/2004 | Ihara et al. ................. | 455/569.1 |
| 2004/0229658 | A1 * | 11/2004 | Kim et al. ................. | 455/569.1 |
| 2005/0143152 | A1 * | 6/2005 | Yueh .......................... | 455/575.6 |
| 2006/0229110 | A1 * | 10/2006 | Tsai ........................... | 455/569.2 |
| 2007/0283395 | A1 * | 12/2007 | Wezowski ...................... | 725/81 |
| 2008/0226112 | A1 * | 9/2008 | Lin ............................. | 381/375 |
| 2009/0233590 | A1 * | 9/2009 | Sinton .......................... | 455/418 |
| 2010/0197361 | A1 * | 8/2010 | Choi et al. ................. | 455/569.1 |
| 2011/0009058 | A1 * | 1/2011 | Ha et al. ...................... | 455/41.1 |

FOREIGN PATENT DOCUMENTS

JP         2006-319572         11/2006

* cited by examiner

*Primary Examiner* — Minh D Dao
(74) *Attorney, Agent, or Firm* — Maschoff Gilmore & Israelsen (57) ABSTRACT

An information processing apparatus or a mobile communication apparatus are connectable to an external device via a short-range wireless communication link. When there is an incoming call, it is determined whether a ringing sound is sounded on both the apparatus and the external device, or whether the ringing is on one of the apparatus and the external device, based on a selected mode. Subsequently, appropriate sound is played based on the selected mode.

18 Claims, 7 Drawing Sheets

INFORMATION PROCESSING APPARATUS AND MOBILE COMMUNICATION APPARATUS

CROSS-REFERENCE TO RELATED APPLICATIONS

This application is based upon and claims the benefit of priority from prior Japanese Patent Application No. 2008-235615, filed Sep. 12, 2008, the entire contents of which are incorporated herein by reference.

BACKGROUND OF THE INVENTION

1. Field of the Invention

The present invention relates to an information processing apparatus and a mobile communication apparatus, which are connectable to an external device via a short-range wireless communication.

2. Description of the Related Art

Generally, an information processing apparatus such as a cellular phone which has a function to reproduce audio data has become popular. When the cellular phone reproduces the audio data, the audio data can be outputted from a headphone connected to the cellular phone. Therefore, a user can enjoy the audio data in a train without paying attention to or disturbing others.

On the other hand, some cellular phones have a function to connect to a headset and a car-mounted device via a short-range wireless communication such as a Bluetooth®. These external devices are much convenient to the user since the user dose not need to carry a cable to connect the cellular phone and the external device. In this application, an earphone generally designates a device connected by a wire, whereas a headset is generally considered a wireless device.

For example, the user can make a hands-free communication via the external device and can enjoy music by utilizing a profile described in the Bluetooth standard on which a call processing and music transmission processing is executed.

However, an incoming call may be occur while the cellular phone is transmitting the music data to the external device. Consequently, a technique that a user is informed of the incoming call while enjoying the music with the external device is needed.

For example, Jpn. Pat. Appln. KOKAI Publication No. 2006-319572 (Igarashi et at.) discloses the external device sounds a ringing tone preliminary stored in it when an incoming call is received by the cellular phone, while the external device and the cellular phone are connected each other.

Generally, a ringing tone, to be outputted via a speaker when a cellular phone receives an incoming call, is selected from a plurality of music data stored in a memory card inserted into the cellular phone or a memory device of the cellular phone. A user can commonly set one of the plurality of music data for all entries in a phone book data, or can set different music data for each entry and each group. As described above, any music data can be set for the entries and groups. Therefore, the user can understand who made a call without checking a display of the cellular phone by listening for sound or a ring tone that corresponds to one or more people.

However, if the predetermined ringing tone, which is stored in the external device, is sounded as disclosed in Igarashi et al., the user will not know who is making a call.

BRIEF SUMMARY OF THE INVENTION

Exemplary embodiments of the present invention provide an information processing apparatus which enables a user easily understand that an incoming call is for the user, when the incoming call is received while the information processing apparatus and an external device is connected each other.

There is an information processing apparatus which includes a communication device configured to communicate with an external device, a memory configured to store a plurality of sound data, and a sound generator configured to output the sound data. An input device is configured to select one of a first mode, a second mode, and a third mode, and for selecting one of the sound data to be output from the sound generator when an incoming signal is received, the sound data is output only by the sound generator of the information processing apparatus in the first mode, the sound data is output only by the external device in the second mode, and the sound data is output by both the sound generator of the information processing apparatus and the external device in the third mode. A controller is configured to control the information processing apparatus, wherein when the incoming signal is received by the information processing apparatus, the controller determines whether the selected sound data is reproducible by the external device if the second mode is selected, and transmits, via the communication device, the sound data to the external device if the sound data is reproducible by the external device.

Further, there is a mobile communication apparatus which includes a radio interface configured to communicate with a base station of a cellular network, a communication device, different from the radio interface, configured to communicate with an external device, a memory configured to store a plurality of sound data, and a sound generator configured to output the sound data.

An input device is configured to select one of a first mode, a second mode, and a third mode, and for selecting one of the sound data to be output from the sound generator when an incoming signal is received, the sound data is output only from the mobile communication apparatus in the first mode, the sound data is output only from the external device in the second mode, and the sound data is output from both the mobile communication apparatus and the external device in the third mode.

Further, there is a controller configured to control the mobile communication apparatus, wherein when the incoming signal is received from the base station via the radio interface, the controller determines whether the sound data which has been selected is reproducible by the external device if the second mode is selected, and transmits, via the communication device, the sound data which has been selected to the external device, only when the sound data is reproducible by the external device.

BRIEF DESCRIPTION OF THE SEVERAL VIEWS OF THE DRAWING

The accompanying drawings, which are incorporated in and constitute a part of the specification, illustrate exemplary embodiments of the invention, and together with the general description given above and the detailed description of the exemplary embodiments given below, serve to explain the principles of the invention.

DETAILED DESCRIPTION OF THE INVENTION

Exemplary embodiments of the present invention will be described hereinafter with reference to the accompanying drawings.

Figure 1:
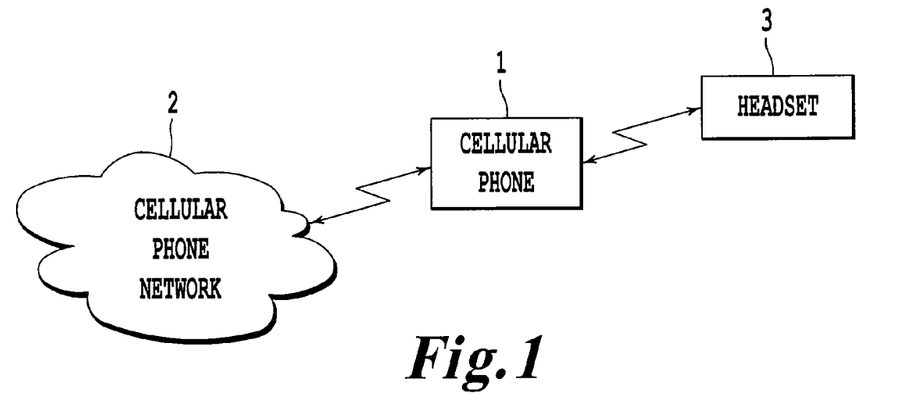
FIG. 1 is a block diagram showing a system composition of an embodiment.

FIG. 1 is a block diagram of a system composition regarding an embodiment. As shown in FIG. 1, a cellular phone 1 as an example of an information processing apparatus communicates with a base station contained in a cellular phone network 2. Also, a headset 3 as an example of an external device is located adjacent to the cellular phone 1 in FIG. 1.

The headset 3 receives audio data from the cellular phone 1 via a short-range wireless communication link such as the Bluetooth® standard, for example, and reproduces the received audio data. A short range is considered to be, for example, less than 500 feet. More preferably, a short range is less than 100 feet. Even more preferably, a short range is considered less than 50 feet. Still more preferably, a short range is 32 feet or 10 meters, or less. Also, the headset 3 executes a hands-free call control when receiving an incoming call and making an outgoing call. Furthermore, the headset 3 controls the cellular phone remotely via the short-range wireless communication link. In this case, the headset 3 is an example of an external device, and other external devices may be used as the external device such as a car-mounted device.

Figure 2:
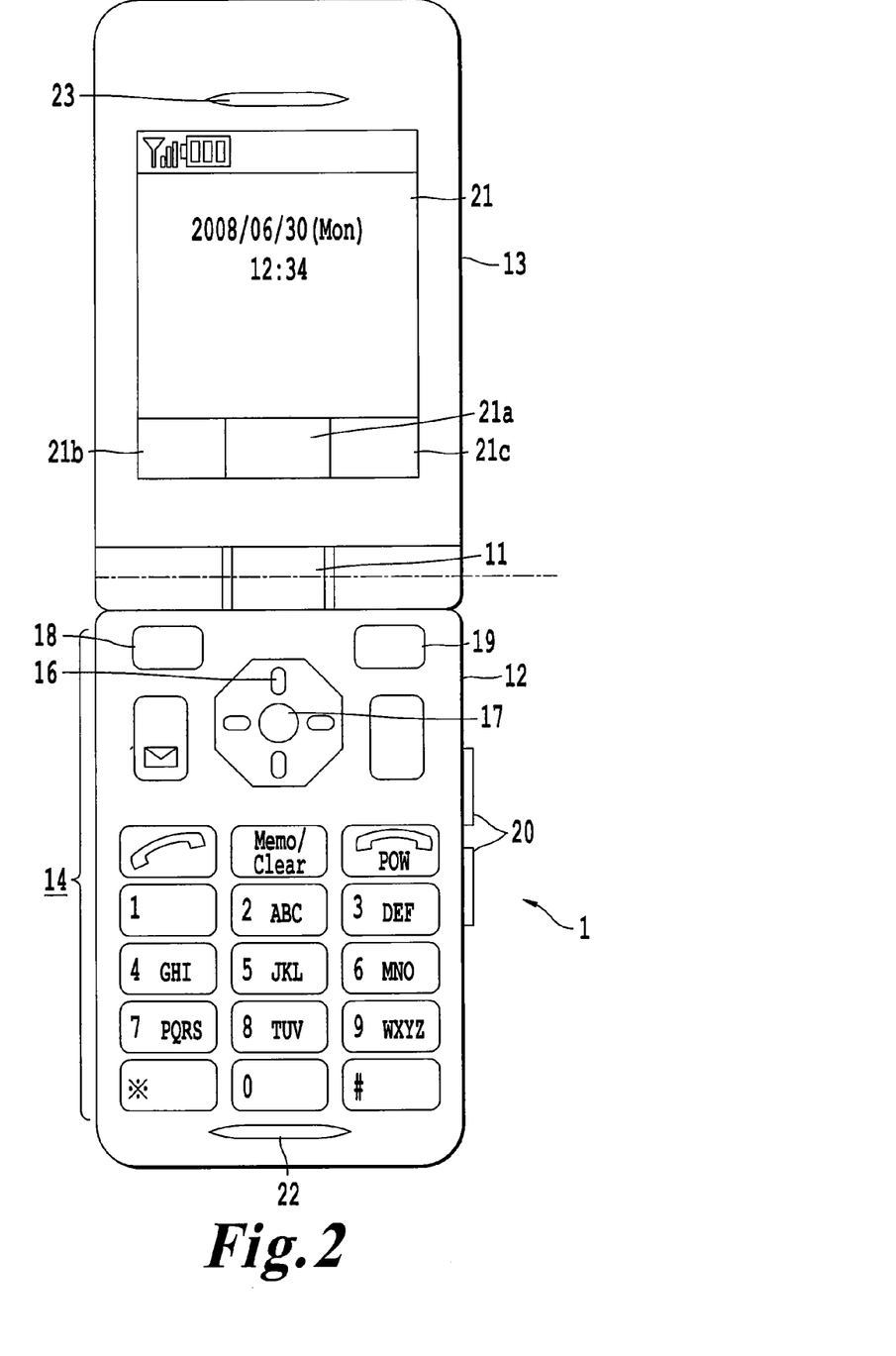
FIG. 2 shows an exemplary appearance of a cellular phone as an example of an information processing apparatus.

FIG. 2 shows an exemplary arrangement of a cellular phone 1 as an example of the information processing apparatus. As shown in FIG. 2, the cellular phone 1 includes a first housing 12 and a second housing 13, and both housings are rotatably connected via a hinge or hinge unit 11. An antenna is placed inside of the cellular phone 1, and the cellular phone 1 makes a wireless communication with a base station via the antenna.

On a front surface of the first housing 12, there is arranged an operation key pad unit 14 including digit keys or buttons such as 0 through 9 and so on, a call key, a redial key, an end/power key, a clear key, and a menu key. Various instructions can be inputted via the operation key unit 14.

Also, the operation key unit 14 includes an arrow key 16 and an enter-key 17 at upper portion of the first housing 12. The arrow key 16 allows inputting of four directions, and a cursor displayed on a display unit 21 is moved from side to side and up and down by manipulating the arrow key 16. On the other hand, the enter-key 17 is used to select or run functions and select an option on a menu screen, and the function to be input is displayed on a function display area 21a of the display unit 21.

Furthermore, there are a left softkey 18 and a right softkey 19 adjacent to the arrow key 16 and the-enter key 17, and side-keys 20 on the side surface of the first housing 12. Functions assigned to the left softkey 18 and right softkey 19 are displayed on a left softkey's function display area 21b and a right softkey's function display area 21c of the display unit 21.

There is a microphone 22 below the operation key unit 14 on the first housing 12, and speech of a user is picked up by the microphone 22 when making a speech communication.

Also, a battery is inserted into a battery compartment set at a back side of the cellular phone 1, and electric power is supplied to circuits from the battery when the cellular phone 1 is turned on by pressing the end/power key of the operation key unit 14.

The display unit 21 is located on a front surface of the second housing 13 and a reception condition, a remaining battery level, a content of email, and a home page and so on are displayed on the display unit 21. The display unit 21 can be implemented using any desired technology such as a LCD (Liquid Crystal Display), OLED (Organic Light Emitting Display), or ILED (Inorganic Light Emitting Display).

Also, there is a speaker 23 above the display unit 21 and a voice from an intended party is output from the speaker 23.

Next, main functions regarding the cellular phone 1 will be explained with reference to FIG. 3.

A radio signal transmitted from a base station of the cellular phone network 2 is received by an antenna 31, and the radio signal is inputted into a receiver circuit (RX) 33 via duplexer 32 (DUP). The RX 33 mixes the inputted radio signal with a local oscillation signal from a frequency synthesizer (SYN) 34 and converts the inputted radio signal into an intermediate frequency signal. SYC is a control signal, generated by the control unit 41, for example, which controls the frequency (intermediate frequency) output by the frequency synthesizer (SYN) 34. Thereafter, the RX 33 transforms the intermediate frequency signal into a baseband signal.

The baseband signal outputted from the RX 33 is inputted into a CDMA signal processing unit 36. The baseband signal is despread with a spreading code by the CDMA signal processing unit 36 and packet data is generated.

A compression/decompression unit 37 includes a DSP (Digital Signal Processor) and so on, and receives the packet data from the CDMA signal processing unit 36. The compression/decompression unit 37 includes a multiplexer/demultiplexer (MPX/DMPX) and the MPX/DMPX 37a demultiplexes the packet data into video data, audio data, text data, and control data. Thereafter, the control data is outputted to a control unit 41, and the video data and the audio data are inputted into a video codec 37b and audio codec 37c respectively in the compression/decompression unit 37.

The video codec 37b decodes the video data and outputs a digital video signal to the control unit 41. The control unit 41 displays the digital video signal on the display unit 21 via a video RAM. The audio codec 37c decodes the audio data and outputs a digital audio signal to a PCM codec 38.

When the cellular phone 1 is in a speech mode, a user's speech is picked up or sensed by the microphone 22 and an analog audio signal is obtained. The analog audio signal is amplified to a predetermined level by the amplifier 40, and thereafter converted into a digital audio signal by the PCM codec 38. The digital audio signal is inputted into the compression/decompression unit 37. Also, text data such as an email generated in the control unit 41 is inputted into the compression/decompression unit 37.

The digital audio signal outputted from the PCM codec 38 is coded by the audio codec 37c according to a format of a transmission rate, and audio data is generated. Also, the video codec 37b of the compression/decompression unit 37 codes a digital video signal according to the H.264 standard or the MPEG-4 standard, for example, and generates coded video data. The MPX/DMPX 37a multiplexes and the audio data, video data, and text data, and packetizes the multiplexed data into a plurality of packet data. The packet data is inputted into the CDMA signal processing unit 36.

Also, the audio codec 37c decodes a digital audio signal outputted from the control unit 41 and transmits audio data to a speaker 25 via a D/A converter 39. The speaker 25, which is a sound generator, is connected to an amplifier 39 and is used for outputting sound the ear of a user. The amplifier 39 may be additionally or alternatively used with the speaker 25. The speakers 23 and 25 may be any type of speaker that generates sound, including a piezoelectric speaker, for example. Further, instead of using speakers 23 and 25, a single speaker may be used, if desired. In this case, it is assumed that there is a file format such as SMAF (Synthetic music Mobile Application Format) which the compression/decompression unit 37 cannot decode, and that the audio data processed by the compression/decompression unit 37 cannot be outputted to both the speaker 25 and a Bluetooth module 48 at the same time.

The CDMA signal processing unit 36 spreads the packet data outputted from the compression/decompression unit 37 with a spreading code assigned to a transmission channel, and the spread packet data is outputted to a transmission circuit (TX) 35. The TX 35 modulates the spread packet data according to a modulation method such as the QPSK (Quadrature Phase Shift Keying) method to generate a transmission signal. The TX 35 up-converts the transmission signal by mixing the local oscillation signal generated by the SYN 34 and radio signal is generated. The TX 35 high-frequency amplifies the radio signal to a transmission power level designated by the control unit 41, thereafter, the radio signal outputted from the TX 35 is transmitted to the base station via the DUP 32 and the antenna 31.

A battery circuit 44 functions as a power supply circuit and generates an operating voltage using an output of a battery 43, and supplies the operating voltage to the circuits. A clock circuit 45 outputs a clock signal and appropriate time information.

Also, a memory card slot 46 is a slot to and from which a memory card 47 is detachable. The memory card 47 is a kind of flash memory card which may be implemented using any desired type of memory, such as a NAND type flash memory card or a NOR type flash memory card, and the video data, the audio data, and a music data are read out from and written to the memory card 47 via a 10-pin terminal, for example.

The cellular phone 1 is equipped with the Bluetooth module for executing short-range wireless communication. The Bluetooth module 48 executes wireless communication with the headset 3 which is adjacent to the cellular phone 1 under the control of a Bluetooth application executed by the control unit 41. Of course, any short-range wireless communication method such as an IrDA method can be utilized in place of the Bluetooth method.

The control unit 41 is equipped with a CPU (Central Processing Unit), a ROM (Read Only Memory), and a RAM (Random Access Memory) and so on. The CPU executes processes based on application programs stored in the ROM and loaded application programs from a memory 42 to the RAM. The memory 42 can be any desired memory such as a disk, or semiconductor based memory such as a ROM or flash memory, for example. Also, the control unit 41 generates control signals to control overall functions of the cellular phone 1. The RAM stores data used by the CPU to execute the processes.

Also, the control unit 41 utilizes transmission protocols such as an OBEX (Objective Exchange), a RFCOMM (RS232 Serial Cable Emulation Profiles), and a SDP (Service Discovery Protocol) to control the short-range wireless communication executed by the Bluetooth module 48 on a profile such as a A2DP (Advanced Audio distribution Profile), HFP (Hands-Free Profile), and AVRCP (Audio/Video Remote Control Profile), when exchanging data with the external device such as the headphone 3. These transmission protocols and profiles have hierarchical structure from an application program as a high layer to a physical layer as a low layer.

An audio/video processing unit 49 decodes audio data and video data arranged in a specific file such as the SMAF file. The decoded audio data is outputted via the speaker 25. Unlike the audio data decoded by the compression/decompression unit 37, it is assumed that the audio data decoded by the audio/video processing unit 49 can not only be outputted from the speaker 25 but also be transmitted from the Bluetooth module 48 to the external device at the same time.

The memory 42 includes a rewritable and nonvolatile memory such as a flash-memory device, a HDD (Hard Disk Drive) or any type of nonvolatile memory including semiconductor memory, and stores application programs executed by the CPU of the control unit 41 and data.

Figure 3:
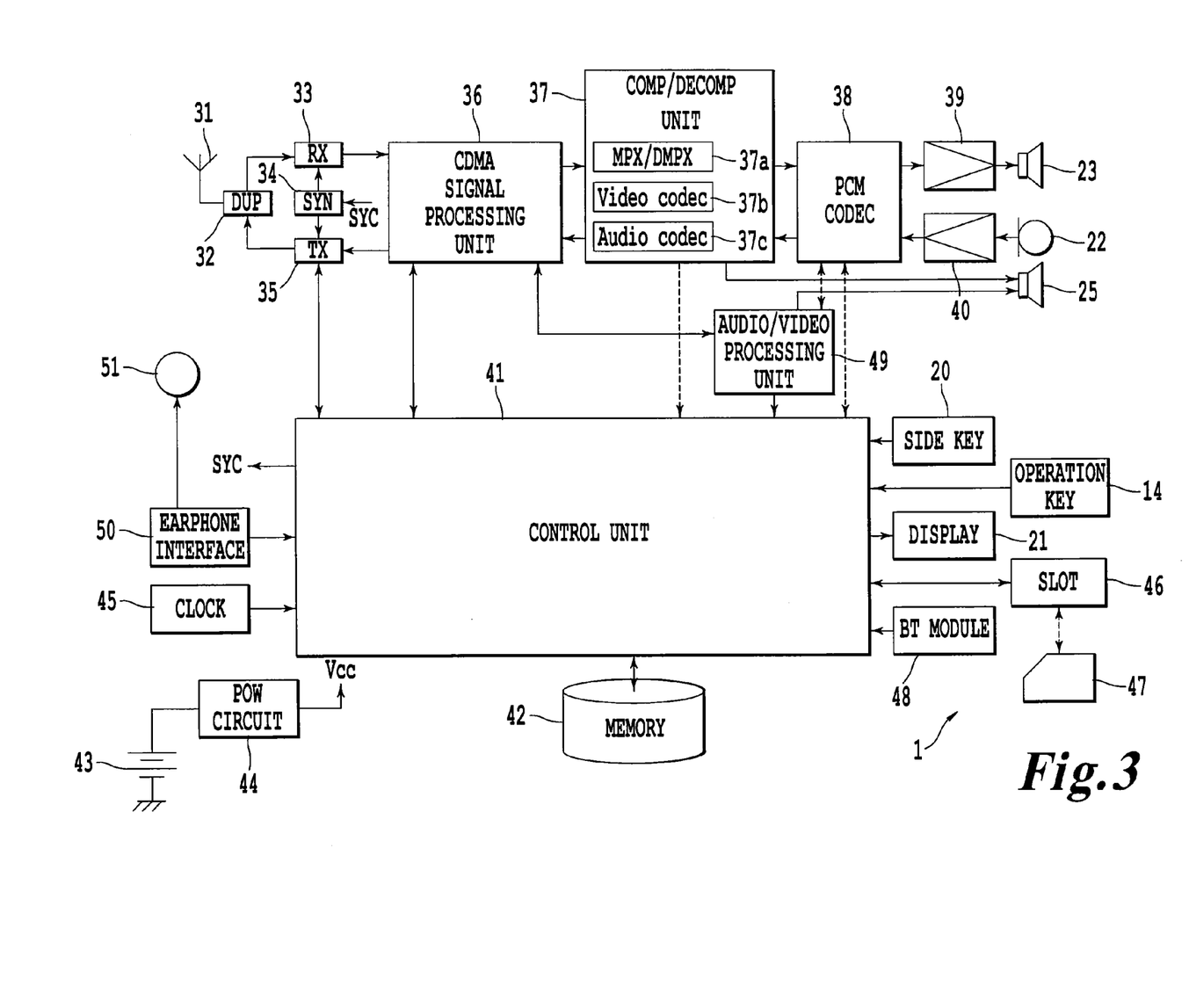
FIG. 3 is a block diagram of the cellular phone.

FIG. 3 illustrates an earphone interface 50 which outputs audio data to an earphone 51 preferably through a wired connection, although a wireless connection to the earphone 51 is also possible. The earphone interface 50 may be a plug or socket into which the earphone plugs. Additionally or alternatively, the earphone interface 50 may process audio data or information into a form which can be played by the earphone 51.

The cellular phone 1 has an audio gateway (AG) function, and in this case, the cellular phone 1 transmits an outgoing call and receives an incoming call to and from the cellular phone network 2 when executing processing according to the HFP. On the other hand, the headset 3 has a hands-free (HF) function, and in this case, the headset 3 transmits an outgoing request and an incoming call response to a device with the AG function and executes a hands-free communication when executing processing according to the HFP.

Also, the cellular phone 1 has a source (SRC) function, and in this case, the cellular phone 1 transmits an audio data when executing processing according to the A2DP. On the other hand, the handset 3 has a sink (SNK) function, and in this case, the headset 3 outputs received audio data via a speaker when executing processing according to the A2DP. The AG, HF, SRC, and SNK are defined in the Bluetooth standard.

The cellular phone 1 and the headset 3 communicate with each other by arbitrary using the HFP and the A2DP. Namely, the cellular phone 1 uses the AG function in the case that the cellular phone 1 executes processing according to the HFP, and the cellular phone 1 uses the SRC function in the case that the cellular phone 1 executes processing according to the A2DP. Likewise, the headset 3 uses the HF function in the case that the headset 3 executes processing the HFP, and the headset 3 uses the SNK function in the case that the headset 3 executes processing according to the A2DP.

Next, a process of generating a ring tone that occurs when the cellular phone 1 receives the incoming call will be explained. Also, in this case, the cellular phone 1 has a normal mode and a silent mode regarding the sounding processing of ringing tone. If the normal mode is set as a sounding mode, the cellular phone 1 sounds the ringing tone via the speaker 25 when the cellular phone 1 receives the incoming call. On the other hand, if the silent mode is set as the sounding mode, the cellular phone 1 sounds no ringing tone but activates a vibrator and/or blinks an LED when the cellular phone 1 receives the incoming call. A user can selectively set one of the normal and silent modes as the sounding mode. For example, when a menu screen on which the normal mode option and the silent mode option are included is displayed on the display unit 14, the user can select one of the normal mode option and the silent mode option by manipulating a given keys of the operation key unit 14.

The ringing tone to be outputted when the incoming call is received is, for example, set from a plurality of music data and audio data stored in the memory 42 and the memory card connected with the memory card 47 slot 46 by selecting from a menu screen on the display unit 21. The ringing tone may be music or audio previously stored in the memory 42 and/or downloaded from a server. As the ringing tone, one of the plurality of ringing tones can commonly be set for all incoming calls, or a different ringing tone can be set for each entry including a phone number, email address, a name, and a picture, and each group including at least one entry. As described above, since the ringing tone can arbitrarily be set to correspond to a particular person or company, by hearing the ringing tone, the user can recognize who is calling without checking the display unit 21.

Furthermore, in this embodiment, one of three modes can be set for the sounding processing of ringing tone when the cellular phone 1 is connected with the headset 3. The first mode is the mode where the ringing tone is sounded only from the cellular phone 1. The second mode is the mode where the ringing tone is sounded only from the headset 3. And the third mode is the mode where the ringing tone is sounded from both of the cellular phone 1 and the headset 3. The user can set one of the first, second, and third modes by selecting from a function selection screen displayed on the display unit 21 via the operation key unit 14. These three modes are explained in detail below with respect to the flowcharts of FIGS. 4-6, respectively.

When the incoming call is received, control unit 41 checks which one of the first through third modes is set, and the control unit 41 executes the sounding processing according to the set mode.

Hereinafter, the process of generating a ring tone according to each of the first, second, and third modes will be described with reference to FIGS. 4, 5, and 6. Also, in this embodiment, the cellular phone 1 and the headset 3 are connected via the short-range wireless communication link according to the Bluetooth standard. If the short-range wireless communication link is not established between the cellular phone 1 and the headset 3, the sounding processing is executed at the cellular phone 1 even if the second mode or the third mode is set, and in this case, the control unit 41 considers which of the normal mode and the silent mode is set as the sounding mode. Also, if temporal disconnection such as a link loss occurs when the short-range wireless communication link is established between the cellular phone 1 and the headset 3 when an incoming call is received, the control unit 41 considers which of the normal mode and the silent mode is set as well.

Figure 4:
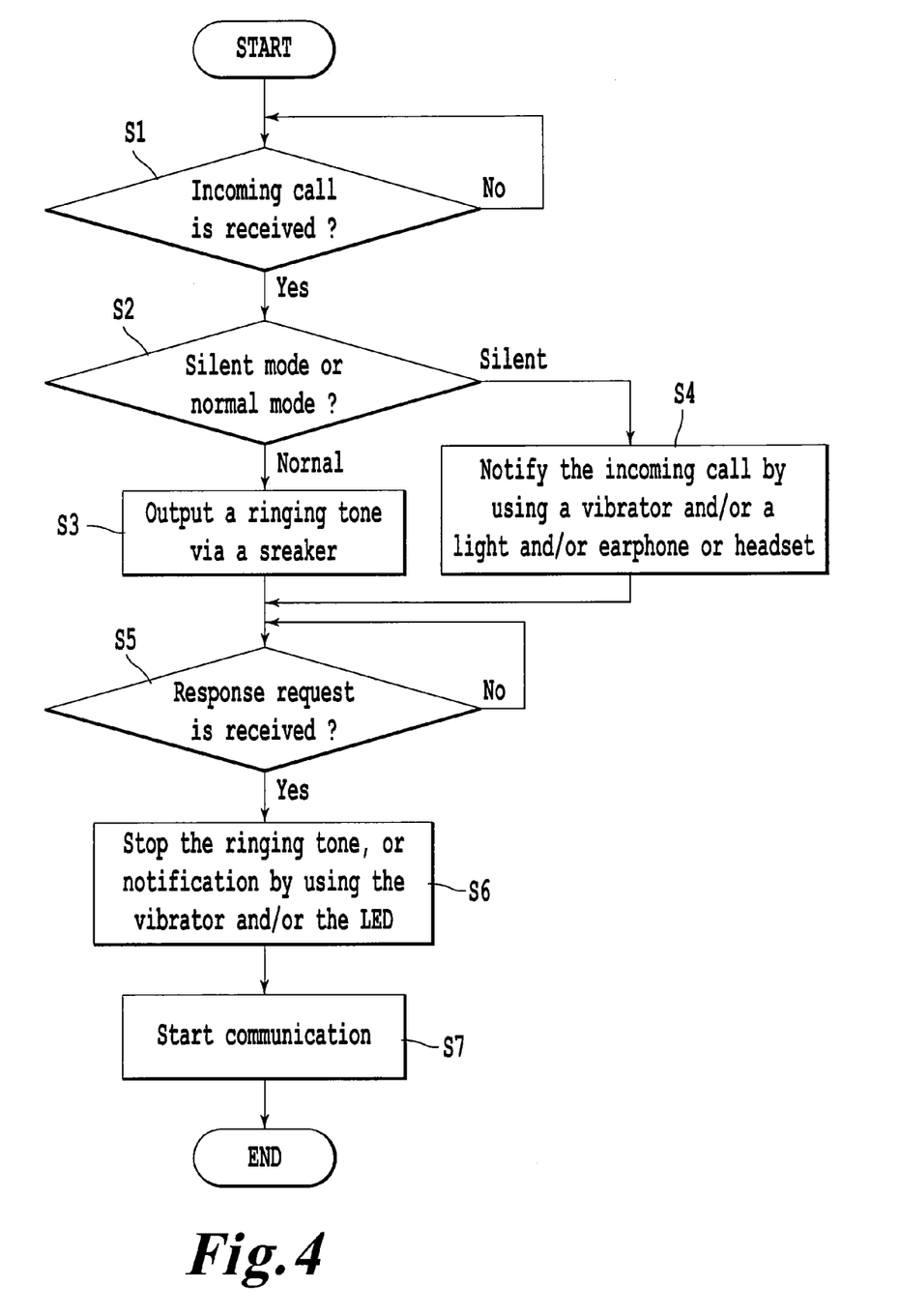
FIG. 4 is a flowchart for explaining a ringing process according to a first ringing mode.

Next, an explanation is provided on the condition that the first mode is set with reference to FIG. 4.

In step S1, the control unit 41 of the cellular phone 1 checks whether the incoming call is received via the antenna 31, and the control unit 41 stands by until the incoming call is received. If a reception of the incoming call is detected in step S1, the control unit 41 checks which one of the normal mode and the silent mode is set as the sounding mode in step S2. If it is detected that the normal mode is set, in step S3, the control unit 41 outputs the preliminary set ringing tone via the speaker 25. In this case, the ringing tone is processed by the compression/decompression unit 37 or the audio/video processing unit 49. Incidentally, the vibrator and the LED can be used to notify of the reception of the incoming call together with the sounding of the ringing tone.

On the other hand, if it is detected that the silent mode is set, in step S4, the control unit 41 indicates the reception of the incoming call by vibrating the vibrator and/or blinking a light such as the LED. Of course, in this case, the ringing tone is not sounded. However, if an earphone or headset is connected to the cellular phone 1, the ringing tone is sounded via the earphone or headset since nobody around will be annoyed by the ringing tone. Further, if a Bluetooth headset is being used, a RING notification is transferred to the headset 3 via the Bluetooth module 48.

In step S5, the control unit 41 checks whether a response request is received from the headset 3 or whether the call key of the operation key unit 14 is depressed. The response request is outputted when a key assigned a call response function is depressed. The control unit 41 continues checking the reception of the response request and depression of the call key until one of the reception of the response request and the depression of the call key is detected, or the incoming call is terminated by the caller.

If the reception of the response request or the depression of the call key is detected, in step S6, the control unit 41 stops sounding the ringing tone which is outputted via the speaker 25 or vibrating the vibration and/or blinking the LED.

Subsequently, in step S7, in a case that the call key of the operation key unit 14 is depressed, a speech communication path is established between the cellular phone 1 and a caller's phone and speech communication is initiated. On the other hand, in a case that the response request is received, the speech communication path is established between the headset 3 and the caller's phone 1, and speech communication is initiated.

Figure 5:
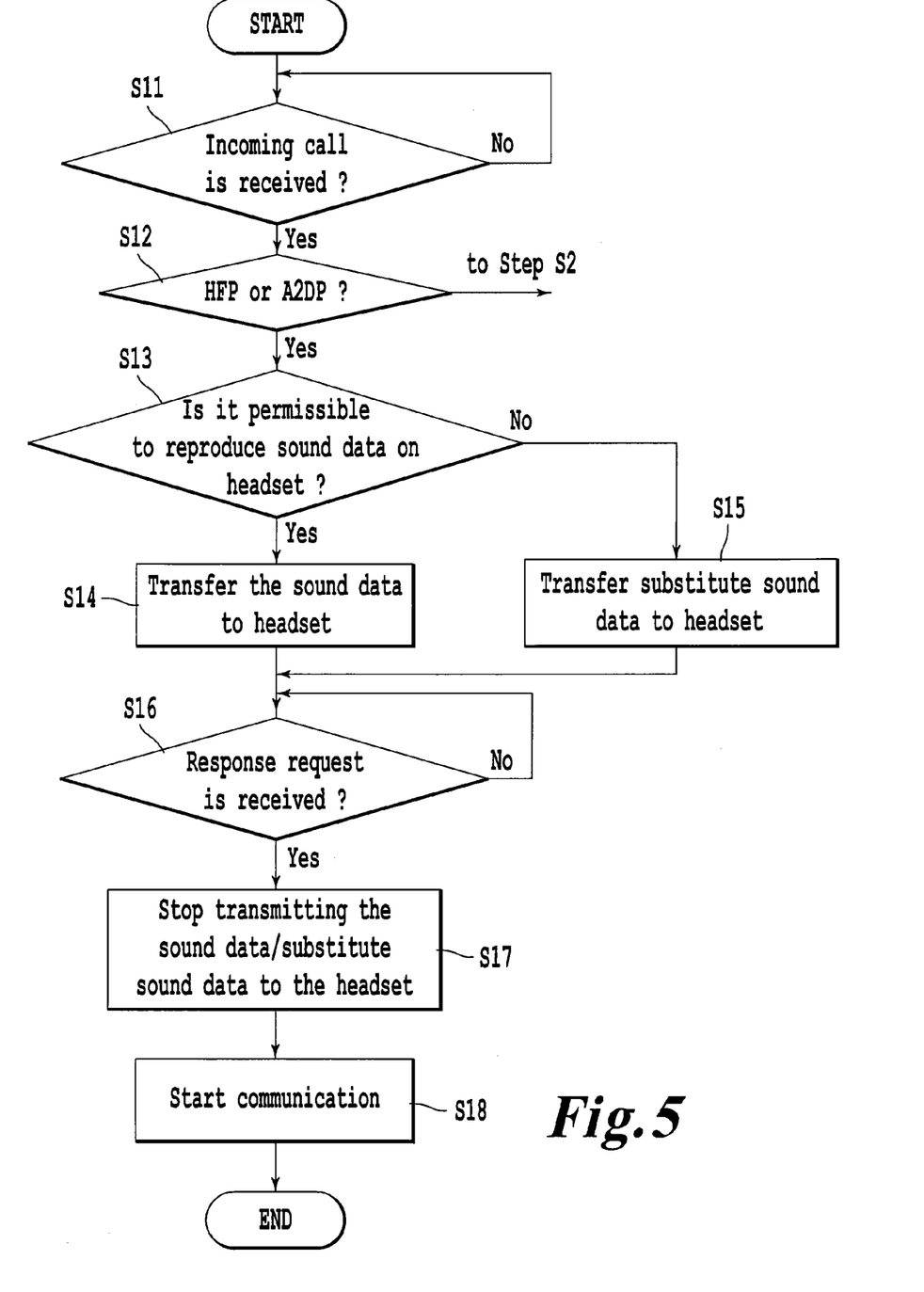
FIG. 5 is a flowchart for explaining a ringing process according to a second ringing mode.

Next, an explanation is provided on the condition that the second mode is set with reference to FIG. 5.

After starting, in step S11, the control unit 41 of the cellular phone 1 checks whether an incoming call is received via the antenna 31, and the control unit 41 stands by until the incoming call is received. If the incoming call is received in step S11, the control unit 41 checks whether the short-range wireless communication link (hereinafter "Bluetooth link") based on at least one of the HFP and the A2DP is established between the cellular phone 1 and the headset 3. If there is no Bluetooth link established between the cellular phone 1 and the headset 3, and the Bluetooth link is based on none of either the HFP or the A2DP, the processing goes to step S2 in FIG. 4. Namely, the control unit 41 does not transmit the ringing tone to the headset 3 but notifies an occurrence of the incoming call according to set one of the normal mode and the silent mode on the cellular phone 1.

On the other hand, if the control unit 41 detects that the Bluetooth link is established between the cellular phone 1 and the headset 3 based on one of the HFP and the A2DP in step 512, flow proceeds to step S13 and the control unit 41 checks whether the music data and/or the audio data (hereinafter, sound data), which is set as the ringing tone by the user, is reproducible by the headset 3. For copyrighted content, reproduction of some sound data may be limited to a specific device. For example, there is a type of memory card 47 which meets the SD-binding, and sound data stored in such memory card 47 is prohibited from being reproduced on a device other than the specific device. The sound data stored in the memory card 47 that meets the SD-binding corresponds to the content which is copyrighted. Also, for a technical reason, there is a ringing tone such as a DTMF (Dual-Tone Multi-Frequency) signal cannot be transmitted to the headset 3, and the DTMF signal corresponds to the content as well. Furthermore, a criterion on whether audio data and music data can be digitally copied can be used to judge whether the audio data corresponds to the content. Whether the sound data is one of copyrighted content according to the SD-binding, the DTMF signal, and digitally copied can be detected by arbitration information store in a header of a file, for example.

If the control unit 41 detects that the sound data is reproducible on the headset 3 in step S13, flow proceeds to step S14 and the control unit 41 controls one of the compression/ decompression unit 47 and the audio/video processing unit 49 to convert the sound data to a given format that meets the Bluetooth standard and transmit the converted sound data to the headset 3. Subsequently, the control unit 42 controls the Bluetooth module 48 to transmit the sound data with the given format.

On the other hand, if the control unit 41 detects that the sound data is not reproducible on the headset 3 in step S13, flow proceeds to step S15 in which the control unit 41 reads a substitute sound data from the memory 42 or the memory card 47, and controls one of the compression/decompression unit 37 and the audio/video processing unit 49 to convert the substitute sound data to the given format. Subsequently, the control unit 41 controls the one of the compression/decompression unit 37 and the audio/video processing unit 49 to transmit the substitute sound data in step S15. The substitute sound data may preliminary be stored in the memory 42, and/or may be arbitrary sound data selected by the user.

In step S12, the control unit 41 may detect that two Bluetooth links based on both of the HFP and the A2DP are established between the cellular phone 1 and the headset 3. Therefore, it is preferable to prioritize the HFP and the A2DP. For example, priority information is stored in the memory 42 and signifies that HFP has priority over the A2DP so that the control unit 42 transmits the sound data and the substitute sound data to the headset 3 preferentially using the HFP.

The headset 3 outputs sound corresponding to the sound data and the substitute sound data transmitted from the cellular phone 1, and notifies that the incoming call is received. Also, while the control unit 41 executes processing according to steps S14 and S15, the RING notification, which is received from the base station periodically, is transferred to the headset 3 via the Bluetooth module 48.

In step S16, the control unit 41 checks whether a response request is received from the headset 3 or whether the call key of the operation key unit 14 is depressed. The response request is outputted when a key assigned a call response function is depressed. The control unit 41 continues checking of the reception of the response request and depression of the call key until one of the reception of the response request and the depression of the call key is detected or the incoming call is terminated by the caller.

If the reception of the response request or the depression of the call key is detected, in step S17, the control unit 41 controls one of the compression/decompression unit 37 and the audio/video processing unit 49 that has been converting the sound data or the substitute sound data to the given format and the Bluetooth module 48 so as to terminate transmitting the sound data or the substitute data to the headset 3. Subsequently, in step S18, in a case that the call key of the operation key unit 14 is depressed, a speech communication path is established between the cellular phone 1 and a caller's phone and speech communication is initiated. On the other hand, in a case that the response request is received, the speech communication path is established between the headset 3 and the caller's phone via the cellular phone 1 and the speech communication is initiated.

In addition, after the start of transmitting the sound data or the substitute sound data in step S14 or S15, the control unit 41 controls the Bluetooth module 48 to stop the transmission of the sound data or the substitute sound data to the headset 3 if the Bluetooth link is lost because of a link loss. At this time, the control unit 41 does not output the sound data via the speaker 25 to satisfy the user's intent that no sound data is outputted from the cellular phone 1. On the other hand, if the Bluetooth link recovers, the control unit 41 controls the Bluetooth module 48 to restart the transmission of the sound data or the substitute sound data to the headset 3.

Figure 6A:
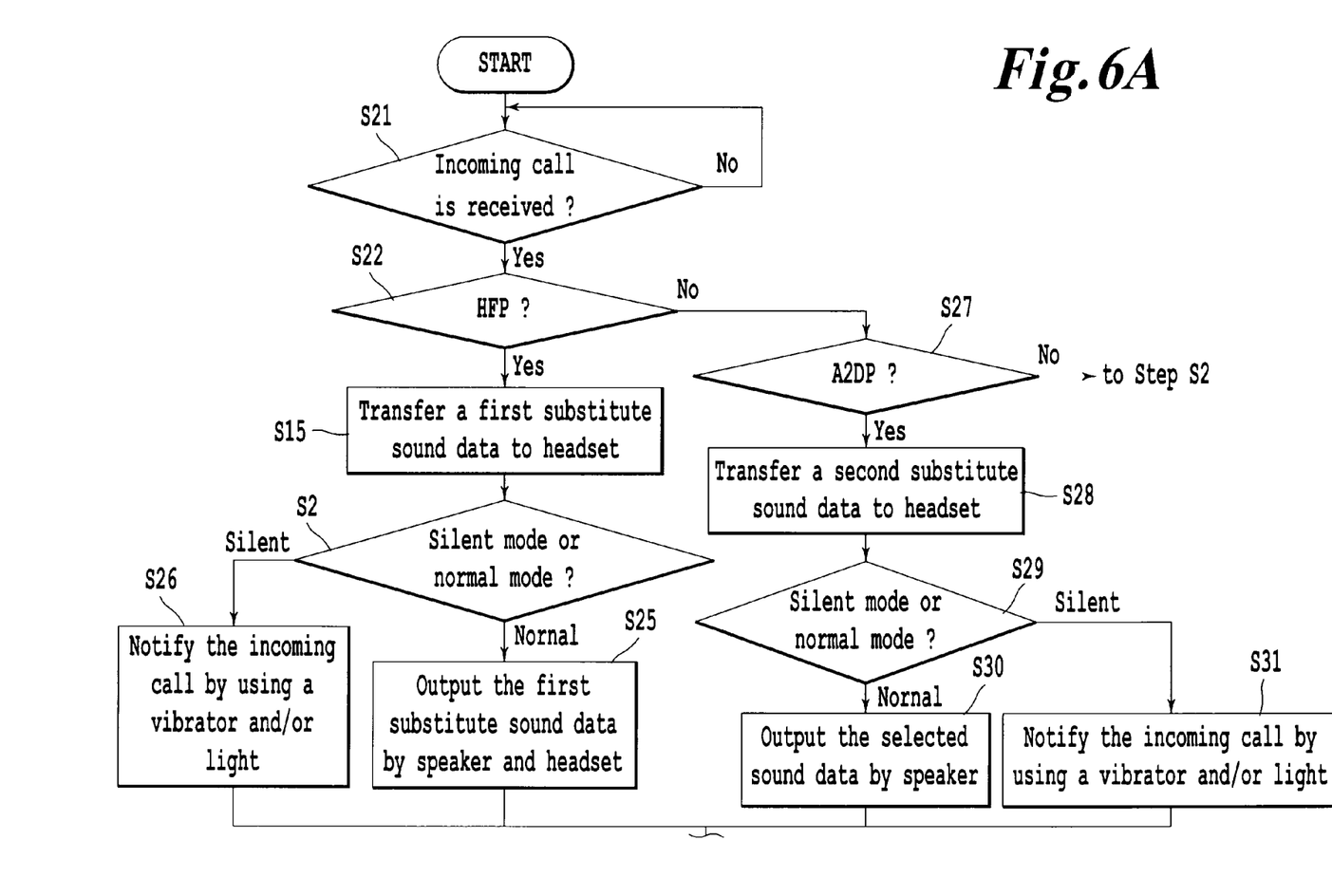
FIGS. 6A and 6B show a flowchart for explaining a ringing process according to a third ringing mode.
Figure 6B:
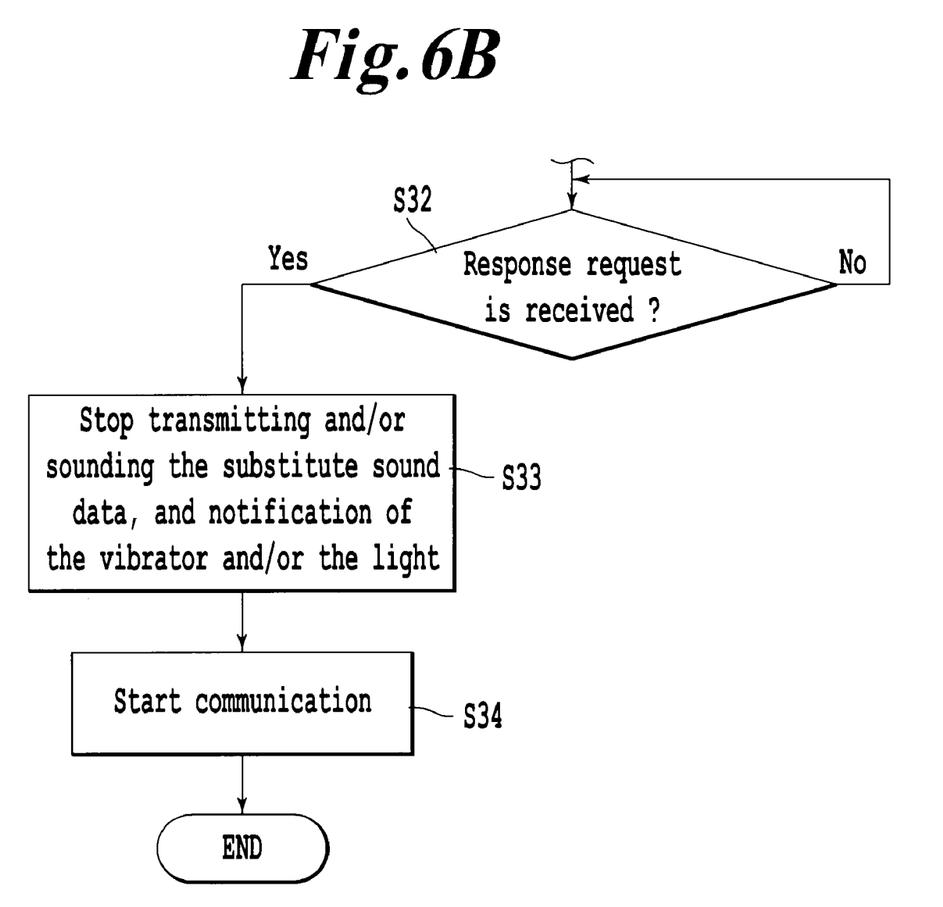

Next, an explanation is provided on the condition that the third mode is set with reference to FIG. 6.

In step S21, the control unit 41 of the cellular phone 1 checks whether an incoming call is received via the antenna 31, and the control unit 41 stands by until the incoming call is received.

If the incoming call is detected in step S21, the control unit 41 checks whether a Bluetooth link established between the cellular phone 1 and the headset 3 is based on the HFP in step S22.

If the Bluetooth link is based on the HFP, the control unit 41 reads first substitute sound data, e.g. a SMAF file, from the memory 42 or the memory card 47, and controls the audio/video processing unit 49 to convert the first substitute sound data to the given format.

The headset 3 notifies the occurrence of the incoming call by reproducing the first substitute sound data received from the cellular phone 1. Also, while the control unit 41 executes processing according to step S23, the RING notification, which is received from the base station periodically, is transferred to the headset 3 via the Bluetooth module 48.

The first substitute sound data may preliminary be stored in the memory 42, or may be arbitrary sound data selected by the user.

In step S24, the control unit 41 checks which one of the normal mode and the silent mode is set as the sounding mode.

If the normal mode is set as the sounding mode, flow proceeds to step S25 in which the control unit 41 controls the audio/video processing unit 49 to reproduce the first substitute sound data. The first substitute sound data reproduced by the audio/video processing unit 49 is outputted from the speaker 25. In this case, as shown in the above explanation, the first substitute data is not only transmitted to the headset 3 but also outputted from the speaker 5.

On the other hand, if it is detected that the silent mode is set as the sounding mode in step S24, the control unit 41 controls the notification executed in the cellular phone 1 according to the silent mode in step S26. For example, the control unit 41 does not transmit the sound data to the headset 3 but notifies of an occurrence of the incoming call using the vibrator and/or a light such as the LED. If the earphone is connected to the cellular phone 1, a sound data selected by the user may be reproduced through the earphone whether or not the silent mode is set as the sounding mode.

If it is detected that the HFP is not used to establish the Bluetooth link between the cellular phone 1 and the headset 3 in step S22, the control unit 41 further checks whether the Bluetooth link is established based on the A2DP in step S27. If there is no Bluetooth link established between the cellular phone 1 and the headset 3 based on the A2DP but the Bluetooth link is established based on other profile than the HFP and the A2DP, the process goes to step S2 in FIG. 4. Namely, the control unit 41 does not transmit the sound data to the headset 3 but notifies an occurrence of the incoming call according to set one of the normal mode and the silent mode on the cellular phone 1.

On the other hand, if it is detected that the Bluetooth link between the cellular phone 1 and the headset 3 is established based on the A2DP (Yes in step S27), flow proceeds to step S28 in which the control unit 41 reads second substitute sound data from the memory 42 or the memory card 47, and controls the compression/decompression unit 37 or the audio/video processing unit 49 to convert the second substitute data to the given format. Subsequently, the control unit 41 controls the Bluetooth module 48 to transmit the given format containing the second substitute data to the headset 3 in step S28.

The headset 3 notifies the occurrence of the incoming call by reproducing the second substitute sound data received from the cellular phone 1. The second substitute sound data may preliminary be stored in the memory 42, or may be an arbitrary sound data selected by the user. Also, the second substitute sound data may be the same as the first substitute sound data transmitted to the headset 3 in step S23.

In step S29, the control unit 41 checks which one of the normal mode and the silent mode is set as the sounding mode. If it is detected that the normal mode is set as the sounding mode, flow proceeds to step S30 and the control unit 41 controls the compression/decompression unit 37 or the audio/video processing unit 49 so that the sound data which has been selected as the ringing tone is outputted from the speaker 25. On the other hand, if it is detected that the silent mode is set as the sounding mode in step S29, the control unit 41 makes the same notification in step S31 as that which is performed in step S26.

Generally, in the case that the Bluetooth link based on the HFP is established between the cellular phone 1 and the headset 3, the user may recognize the notification of the reception of the incoming call from both the cellular phone 1 and the headset 3. For example, the user is in a condition that the user is willing to make a hands-free call using the headset 3. In this case, since the same first substitute sound data is reproduced in the cellular phone 1 and the headset 3 as described above, the user is not confused to hear different ringing sounds at the same time.

On the other hand, in the case that the Bluetooth link based on the A2DP is established between the cellular phone 1 and the headset 3, the user will usually be enjoying music and conversation with the headset 3, e.g. the headset 3 is utilized as a headphone. Therefore, unlike the HFP, the user is less likely to be confused by the reproduction of different sound data from the cellular phone 1 and the headset 3. Thus, the headset 3 can continue to output music during step S30, and it is not necessary for the second substitute sound data to be output by the headset 3, (i.e., the headset 3 may be in a state which does not output the second substitute sound data.

In step S32, the control unit 41 checks whether a response request is received from the headset 3 or whether the call key of the operation key unit 14 is depressed. The response request is outputted when a key assigned a call response function is depressed. The control unit 41 continues checking for the reception of the response request and depression of the call key until one of the reception of the response request and the depression of the call key is detected or the incoming call is terminated by the caller.

If the reception of the response request or the depression of the call key is detected, in step S33, the control unit 41 controls the audio/video processing unit 49 that has been converting the first substitute sound data or the second substitute sound data to the given format and the Bluetooth module 48 so as to stop transmitting the first or second substitute sound data to the headset 3. At the same time, the control unit 41 controls one of the compression/decompression unit 37 and the audio/video processing unit 49 that has been reproducing the sound data or the first substitute sound data so as to stop reproducing the sound data or the first substitute sound data. If the silent mode is set as the ringing mode, the control unit 41 causes the vibration of the vibrator and/or lighting up of the LED, for example.

Subsequently, in step S34, in a case that the call key of the operation key unit 14 is depressed, a speech communication path is established between the cellular phone 1 and a caller's phone and speech communication is initiated. On the other hand, in a case that the response request is received, the speech communication path is established between the headset 3 and the caller's phone via the cellular phone 1 and the speech communication is initiated.

In this embodiment, even when the incoming call is received while the cellular phone 1 and the headset 3 are connected via the Bluetooth link and the second mode is set, the sound data arbitrarily set by the user is outputted from the headset 3. Therefore, by hearing the outputted sound data, the user can recognize who is calling and/or a group to which a caller belongs without checking the display unit 24.

Also, the control unit 41 of the cellular phone 1 transmits the substitute sound data to the headset 3, if the control unit 41 detects that the sound data is prohibited from being reproduced by the headset 3. Therefore, the failure to output any sound data from the headset 3 is avoided, against the user's intent.

Furthermore, the user selects one of the first, second, and third modes, which are the sounding processing of the ringing tone while the Bluetooth link is established between the cellular phone 1 and the headset 3, according to his/her situation.

Furthermore, if no Bluetooth link based on the HFP is established when an incoming call is received, the control unit 41 may try to establish the Bluetooth link based on the HFP, even if the Bluetooth link based on the A2DP is established between the cellular phone 1 and the headset 3.

Furthermore, when an incoming call is received while a music content is transmitted from the cellular phone 1 to the headset 3 over the Bluetooth link based on the A2DP, the transmission of the music content may be suspended or ceased according to the timing of the speech communication.

Also, the sounding processing of the ringing tone may be applied to a sounding processing occurred when an email message is received and an alarm notification processing processed by an alarm function.

The present invention is not limited to the above embodiments, and constituent elements can be variously modified and embodied at the execution stage within the spirit and scope of the invention. Various inventions can be formed by proper combinations of a plurality of constituent elements disclosed in the above embodiments. For example, several constituent elements may be omitted from the all the constituent elements in each embodiment. In addition, constituent elements of the different embodiments may be combined as needed.

This invention may be applied to a PDA (Personal Digital Assistant), a personal computer, a portable game machine, and a portable music player and so on.

Also, a series of processing above regarding this invention can be realized by means of not only a software product but also a hardware product, or a product which is a combination of hardware and software.

Furthermore, each step described in the flowchart is not necessarily executed in the order shown in the flowchart, but some steps may be executed in parallel.

What is claimed is:

1. An information processing apparatus, comprising:
 a communication device configured to communicate with an external device;
 a memory configured to store a plurality of sound data;
 a sound generator configured to output the sound data;
 an input device configured to select one of a first mode, a second mode, and a third mode, and to select one of the sound data to be output from the sound generator when an incoming signal is received, the sound data is output only by the sound generator of the information processing apparatus in the first mode, the sound data is output only by the external device in the second mode, and the sound data is output by both the sound generator of the information processing apparatus and the external device in the third mode; and a controller configured to control the information processing apparatus, wherein when the incoming signal is received by the information processing apparatus, the controller determines whether the selected sound data is reproducible by the external device if the second mode is selected, and transmits, via the communication device, the sound data to the external device if the sound data is reproducible by the external device.

2. The information processing apparatus according to claim 1, wherein:

at least one of the plurality of sound data stored in the memory is substitute sound data which is output as a substitute when other sound data is not reproducible, and the controller controls the communication device to transmit the substitute sound data to the external device, when the sound data which has been selected is not reproducible by the external device.

3. The information processing apparatus according to claim 2, wherein:

the communication device establishes a first communication link with the external device based on a first profile and a second communication link based on a second profile, the first profile relating to a hands-free communication procedure and the second profile relating to an audio data transmission procedure, and the controller, when the incoming signal is received and the third mode is selected, controls the sound generator to output the substitute sound data and transmits the substitute sound data to the external device if the first communication link is established, and controls the sound generator to output the selected sound data and transmit the substitute sound data to the external device if the second communication link is established.

4. The information processing apparatus according to claim 3, wherein:

the first profile is a Hands-Free Profile of the Bluetooth standard, and the second profile is an Advanced Audio Distribution Profile of the Bluetooth standard.

5. The information processing apparatus according to claim 3, wherein:

the substitute sound data to be output by the sound generator and to be transmitted to the external device when the third mode is selected is formatted in a Synthetic music Mobile Application Format (SMAF).

6. The information processing apparatus according to claim 1, wherein:

the controller controls the sound generator to play the selected sound data even if the second mode is selected, if the short-range communication link is not established with the external device.

7. The information processing apparatus according to claim 1, further comprising:

an earphone interface configured to be connectable with an earphone, wherein the controller reproduces the selected sound data via the earphone even if the second mode is selected.

8. The information processing apparatus according to claim 1, wherein:

the communication device is a Bluetooth device.

9. The information processing apparatus according to claim 1, wherein:

the communication device is a short range communication device.

10. A mobile communication apparatus, comprising:

a radio interface configured to communicate with a base station of a cellular network;

a communication device, different from the radio interface, configured to communicate with an external device;

a memory configured to store a plurality of sound data;

a sound generator configured to output the sound data;

an input device configured to select one of a first mode, a second mode, and a third mode, and for selecting one of the sound data to be output from the sound generator when an incoming signal is received, the sound data is output only from the mobile communication apparatus in the first mode, the sound data is output only from the external device in the second mode, and the sound data is output from both the mobile communication apparatus and the external device in the third mode; and a controller configured to control the mobile communication apparatus, wherein when the incoming signal is received from the base station via the radio interface, the controller determines whether the sound data which has been selected is reproducible by the external device if the second mode is selected, and transmits, via the communication device, the sound data which has been selected to the external device, only when the sound data is reproducible by the external device.

11. The mobile communication apparatus according to claim 10, wherein:

at least one of the plurality of sound data stored in the memory is substitute sound data which is output as a substitute when other sound data is not reproducible, and the controller controls the communication device to transmit the substitute sound data to the external device, when the sound data which has been selected is not reproducible by the external device.

12. The mobile communication apparatus according to claim 10, wherein:

the communication device establishes a first communication link with the external device based on a first profile and a second communication link based on a second profile, the first profile relating to a hands-free communication procedure and the second profile relating to an audio data transmission procedure, and the controller, when the incoming signal is received and the third mode is selected, controls the sound generator to output the substitute sound data and transmits the substitute sound data to the external device if the first communication link is established, and controls the sound generator to output the selected sound data and transmit the substitute sound data to the external device if the second communication link is established.

13. The mobile communication apparatus according to claim 12, wherein:

the first profile is a Hands-Free Profile of the Bluetooth standard, and the second profile is an Advanced Audio Distribution Profile of the Bluetooth standard.

14. The mobile communication apparatus according to claim 12, wherein:

the substitute sound data to be output by the sound generator and to be transmitted to the external device when the third mode is selected is formatted in a Synthetic music Mobile Application Format (SMAF).

15. The mobile communication apparatus according to claim 10, wherein:

the controller controls the sound generator to play the selected sound data even if the second mode is selected, if the short-range communication link is not established with the external device.

16. The mobile communication apparatus according to claim 10, further comprising:

an earphone interface configured to be connectable with an earphone, wherein the controller reproduces the selected sound data via the earphone even if the second mode is selected.

17. The information processing apparatus according to claim 10, wherein:

the communication device is a Bluetooth device.

18. The information processing apparatus according to claim 10, wherein:

the communication device is a short range communication device.

* * * * *